United States Patent [19]

Whaley

[11] 4,401,292
[45] Aug. 30, 1983

[54] VALVE SEAT STRUCTURE

[75] Inventor: William L. Whaley, Houston, Tex.

[73] Assignee: ACF Industries, Incorporated, New York, N.Y.

[21] Appl. No.: 340,951

[22] Filed: Jan. 21, 1982

[51] Int. Cl.³ ............................................. F16K 25/00
[52] U.S. Cl. .................................... 251/172; 251/196; 251/328
[58] Field of Search ............... 251/196, 328, 163, 171, 251/172, 174

[56] References Cited

U.S. PATENT DOCUMENTS

| | | | |
|---|---|---|---|
| 2,868,498 | 1/1959 | Kaiser | 251/172 |
| 3,006,599 | 10/1961 | Eckert | 251/174 X |
| 4,116,419 | 9/1978 | Diehl | 251/196 |
| 4,364,544 | 12/1982 | Kim | 251/172 X |

*Primary Examiner*—Harold W. Weakley
*Attorney, Agent, or Firm*—Marvin J. Marnock

[57] ABSTRACT

A seat assembly for an expanding gate valve comprising an outer loose fitting main ring (31) with a resilient face seal (41) for sealing against an expanding gate assembly which is mounted in a valve chamber (11) and an inner auxiliary ring (44) fitting loosely in a counterbore recess in the main ring (31) for sealing against the rear wall (35) of a seat pocket (26). An O-ring (61) between opposed surfaces (51, 52) of the rings (31, 44) continuously urges the rings apart and their orientation such that when the gate assembly is expanded in its open and closed positions, the front face (38) of the main ring (31) is flush against the adjacent sealing surface (25) of the gate assembly and the rear face (46) of the auxiliary ring (44) is flush against the rear wall (35) of the seat pocket (26). When the sealing surfaces (24, 25) of the gate assembly are not parallel or there is a misalignment between the gate assembly sealing surfaces and the adjacent valve seat structure, pressurized fluid from the flow passage (12) enters between the rings (44, 31) of the upstream seat assembly. If there is a leak in the downstream seal or the valve chamber is free of flowline pressure, fluid pressure in the flowline forces the rings (31, 44) of the upstream seal assembly into sealing engagement with the gate element (19) and seat pocket wall (35), respectively. In addition, the O-ring (61) is radially expanded and compressed by the fluid pressure to seal between the rings (31, 44). The annular resilient seal (41) in the face (38) of the outer ring (31) is spaced a radial distance from the flow passage (12) which is less than the radial distance of the O-ring (61) from the flow passage (12) and provides a fluid pressure differential area for urging the outer ring (31) to seal against the valve element (19). The seat assembly is intended for upstream sealing but may be used as a downstream seal assembly which seals when the valve is closed by flowline pressure inducing a check valve action of the gate assembly.

11 Claims, 4 Drawing Figures

VALVE SEAT STRUCTURE

BACKGROUND OF THE INVENTION

This invention relates generally to gate valves and more particularly to an improved valve seat structure for expanding gate valves. Expanding gate valves utilize expanding gate assembly structures comprising a gate element and segment which are adapted to expand transversely of one another against seating rings mounted in the valve body for effecting upstream and downstream seals.

Various types of seating rings and seating ring assemblies have been devised for such valves. With many of these, such as where the seats are press fit into seat pockets in the valve body, the seats must be installed or removed for repair purposes using special tools and associated costly procedures.

With other types of seating ring assemblies, a large drag force is developed between the gate assembly and the seating ring elements when the expanded gate assembly initiates movement from its open and closed positions. Accordingly, a very large torque force is required to move the gate assembly so as to operate the valve.

In addition, a problem always encountered with this type of valve is that of maintaining parallelism between the flat outer faces of the gate and segment elements of the gate assembly which are intended to act as sealing surfaces. When these outer faces are out of parallel, the ability of the valve to achieve a seal is impaired, particularly as regards the upstream side of the valve. While in certain installations it is only necessary for a valve to stop flow from passing out the downstream side, there are other installations where it is necessary that the valve stops flow on the upstream side to thereby block fluid in the flowline from entering the valve chamber. It is also desirable if the downstream seal develops a leak, that the upstream seal become effective. An upstream seal is also necessary to perform a block and bleed service of the valve, i.e., a service where the valve chamber can be bled to indicate if there is leakage past either seat.

It is, of course, extremely difficult to machine gate assemblies wherein the outer faces of the gate and segment elements are machined perfectly parallel and also maintained in a parallel relationship when the gate assembly is moved to its expanded condition in the open and closed positions of the valve.

It is therefore an object of the invention to provide an improved valve seat structure that compensates for out of parallelism and misalignment between the normally sealing surfaces of the gate assembly elements when the gate assembly is in the expanded condition and which is able to provide an effective seal between the gate assembly and the upstream valve seat to block flowline fluid from entering the valve chamber or to provide an effective upstream seal if leakage occurs on the downstream side of the valve.

It is another object of the invention to provide an improved seat structure for a parallel expanding gate valve which can be easily installed and removed without the use of special tools and is able to achieve sealing relationships with the gate assembly elements under out of parallel conditions of the sealing surfaces of the gate assembly.

It is still another object of the invention to provide a valve seat structure for a parallel expanding gate valve whereby the force or torque required to overcome the drag imposed by the gate assembly and to operate the valve is minimized while yet maintaining an adequate seal.

It is a further object to provide an improved expanding gate valve with a unique valve seat structure which compensates for out of parallelism between the normally sealing surfaces of the expanding gate assembly to provide an effective seal between the gate assembly and the valve seat structure when the valve is in its fully open and fully closed conditions and wherein a relatively small torque is required to drive the valve stem and operate the valve.

SUMMARY OF THE INVENTION

The invention is an improved valve seat structure for use in an expanding gate valve. The valve seat structure is adapted to be positioned within each annular seat pocket which is formed about the flow passage adjacent the valve chamber on both the upstream and downstream sides of the valve. The valve seat structure includes a metallic seat ring which is disposed loosely within the seat pocket and provided with an annular groove on the front face thereof for receiving an annular plastic insert which is adapted to conform to the flatness and parallelism of the gate assembly upon its expansion into contact against the valve seat. The seat ring is also provided with a counterbore annular recess on the side thereof which faces the bottom of the seat pocket and accommodates an annular sealing ring or "float" ring therein. The inner sealing ring is characterized by an outer diameter slightly smaller than the diameter of the counterbore recess in the seat ring and an axial dimension which slightly exceeds the depth of the counterbore in which it is received. An annular groove and radial shoulder is provided on the external cylindrical surface of the inner ring by a reduction in diameter of the inner end portion of the inner ring. When the inner ring is seated in the counterbore of the seat ring, an annular chamber is thereby provided between the radial shoulder of the inner ring and the radial surface formed by the counterbore. A resilient annular element, such as an O-ring, with an inner diameter corresponding to the reduced diameter portion of the float ring is disposed within the annular chamber. The resilient element is provided with a cross-section which is slightly larger than the axial dimension of the annular groove whereby it is compressed between the two ring elements when the inner ring is flush against the bottom of the counterbore. The face of the inner ring disposed toward the bottom of the seat pocket includes an annular land area adjacent its central axial bore and a frustoconical surface which tapers toward the front of the seat structure thereby providing a relief area which is out of contact with the bottom of the seat pocket.

The valve seat structure compensates for the condition where the outer sealing surfaces of the gate assembly elements are not perfectly parallel and where similar out-of-parallelism exists between the faces of the seat ring and bottom of the seat pocket. Due to action of the annular resilient element which tends to urge the inner "float" ring and seat ring apart, the seat ring is adapted to align itself such that its front face is disposed flush against the flat face of the segment or gate element when the gate assembly is in expanded condition. At the same time, the inner ring orients itself such that its annular land surface on the outer face thereof is flush against the bottom of the seat pocket. When line pressure exists on the upstream side of the valve, fluid enters from the flowline between the abutting faces of the inner sealing ring and the seat ring and exerts a fluid pressure therebetween. The radial distance between the center of the flowline and the annular resilient member exceeds the radial distance between the center of the flowline and the inner edge of the plastic insert on the front face of the seat ring whereby a differential area exists which urges the seat ring towards the gate assembly element to effect a sealing contact therewith. At the same time, fluid pressure between the seat ring and the inner ring causes a radial expansion and compression of the annular resilient element against the cylindrical wall of the counterbore to effect a seal therebetween and also effects a metal-to-metal seal between the land surface of the inner ring and the bottom of the seat pocket.

In the closed condition of the valve, the gate assembly seals against the downstream valve structure by a check valve action induced by flowline pressure against the gate assembly. The upstream valve seat structure operates to effect a seal when there is little or no fluid pressure in the valve chamber as occurs during the development of a leak in the downstream seal or during a block and bleed service of the valve.

DESCRIPTION OF A PREFERRED EMBODIMENT

Figure 1:
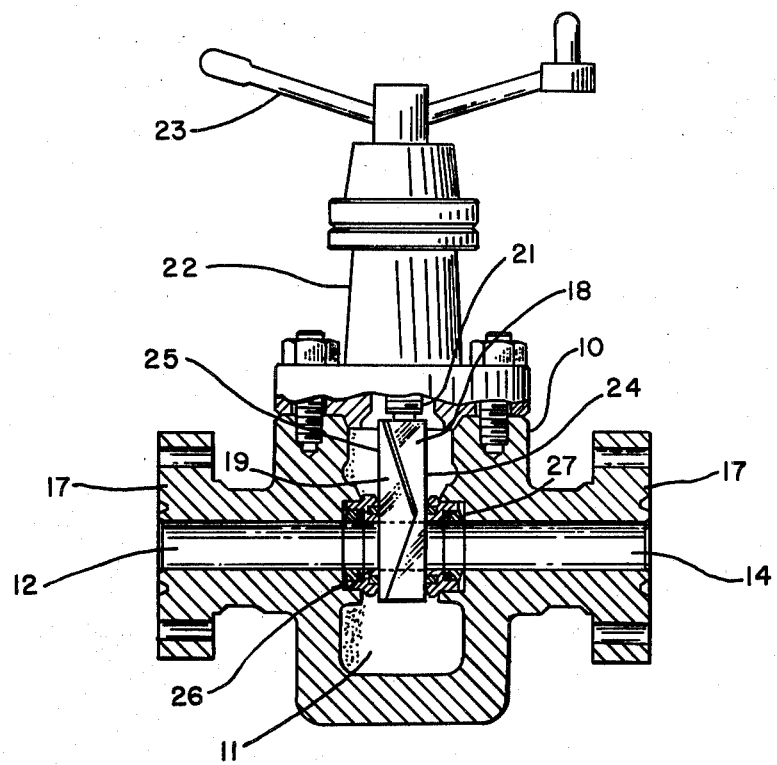
FIG. 1 is a sectional view of an expanding gate valve constructed according to a preferred embodiment of the invention, with the gate mechanism expanded in the fully open position and the upper portion of the valve shown in elevation.

Referring to the drawings in greater detail, the invention is illustrated herein in connection with the gate valve of conventional type which utilizes the principle of parallel expanding gates for obtaining a positive, mechanical seal on both the upstream and downstream sides of the gates. FIG. 1 shows such a gate valve which employs the seat assembly of this invention. The valve shown in FIG. 1 includes a valve body 10 provided with a valve chamber 11 and inlet and outlet flow passages 12 and 14 which are adapted to be in fluid communication with the valve chamber 11 to form a flowway through the valve. Flanges 17 are formed at the ends of the valve body to provide means for connecting the valve to a flowline in the conventional manner.

Within the valve chamber 11, a gate assembly is mounted for sliding movement transversely of the flow passages to open or close the flowway. The gate assembly is of conventional design and comprises a gate member 18 and a segment 19. The gate 18 is connected at its upper end to a valve stem 21 carried in the valve bonnet 22 which is bolted atop the valve body 10 and closes the upper end of the valve chamber 11. The stem 21 extends through the bonnet and at its upper end is provided with a valve actuating member such as a handwheel 23. The stem 21 is connected to the gate member 18 so that upon rotation of the handwheel, the gate assembly is movable across the flowway to open or close the valve. In the open position, ports in the gate and segment are aligned with the inlet and outlet passages 12 and 14. As is conventional, the gate member 18 is provided with a V-shaped recess which accommodates the wedge shaped segment 19, the wedge faces of which conform to the surfaces of the V-shaped recess and are in sliding contact therewith. As is well known to those skilled in the art, the movement of the gate assembly to open or close the valve, causes an expansion of the gate assembly when in the open and closed positions due to sliding movement between the gate member 18 and segment member 19, the sliding movement being induced by suitable stops (not shown) in the valve chamber which limit the vertical movement of the segment 19 relative to the gate 18.

For sealing, the gate 18 is provided with a flat outwardly facing sealing surface 24 which is oriented substantially parallel at all times to a similar outward facing sealing surface 25 on the segment 19. It is to be understood, of course, that due to machining limitations, perfect parallelism hardly ever exists between the sealing surfaces 24 and 25 of the gate assembly. When the gate assembly is expanded in the open and closed conditions of the valve, the surfaces 24 and 25 are intended to establish sealing relationships with the novel valve seat structure of the invention to be hereinafter described. Between the open and closed positions, it is also to be understood that the gate assembly assumes a collapsed position which is induced by a suitable conventional means, such as springs affixed to the sides of the gate and segment for continuously urging them together.

At the inner ends of the flow passages 12 and 14, the valve body is provided with annular recesses 26 and 27, respectively, surrounding the flowway in concentric relation therewith and opening into the valve chamber 11. The annular recesses 26 and 27 form seat pockets in each of which the valve seat assembly of this invention is inserted.

Figure 2:
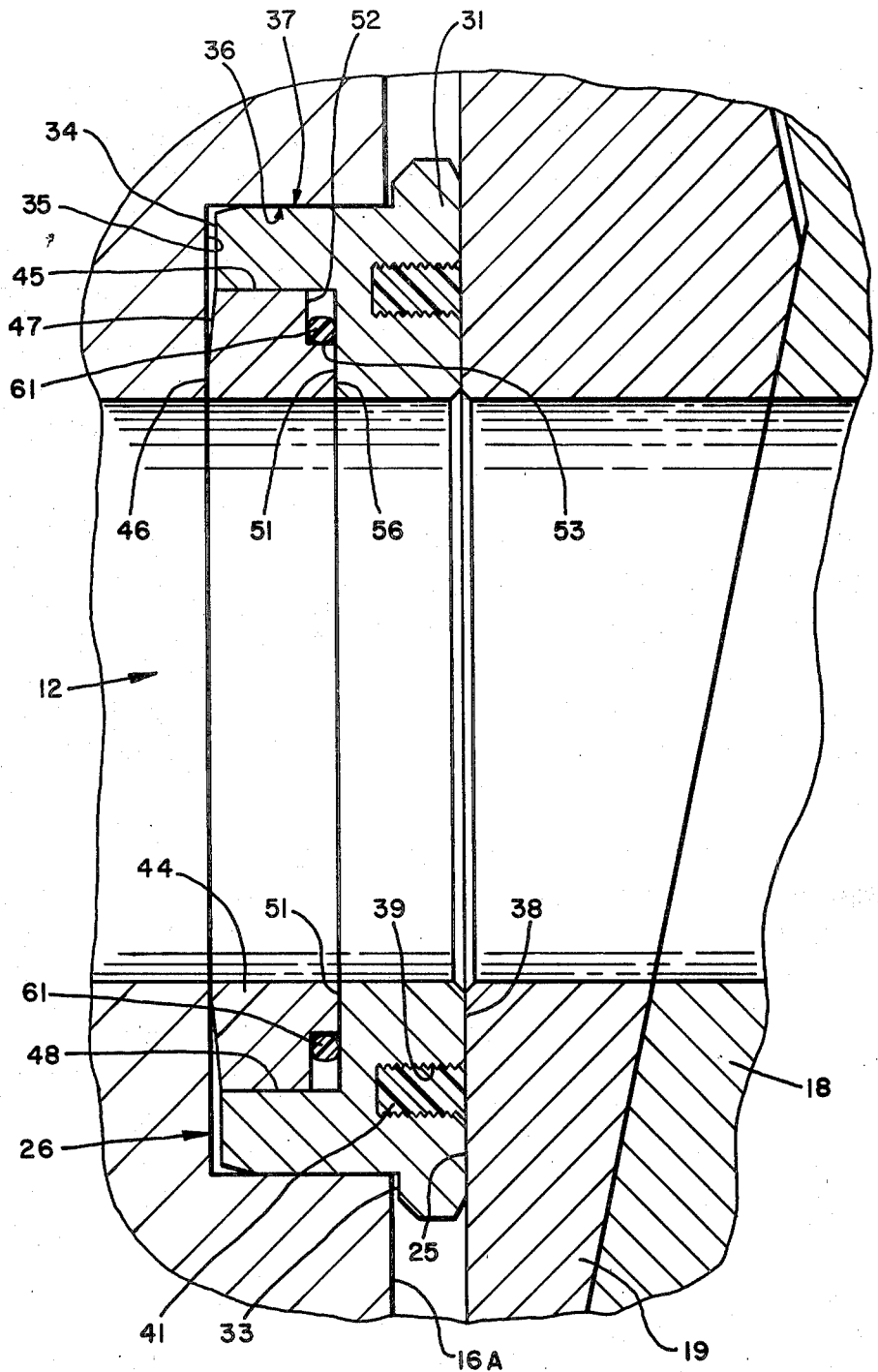
FIG. 2 is a fragmentary sectional view taken on a vertical plane and illustrating a valve seat constructed according to the preferred embodiment of the invention, with the gate assembly expanded in the fully open position of the valve and showing the valve seat assembly under the ideal condition wherein the sealing faces of the gate assembly, the front and rear faces of the seat ring and the bottom of the seat pocket are perfectly planar and in parallel relationship to one another.
Figure 3:
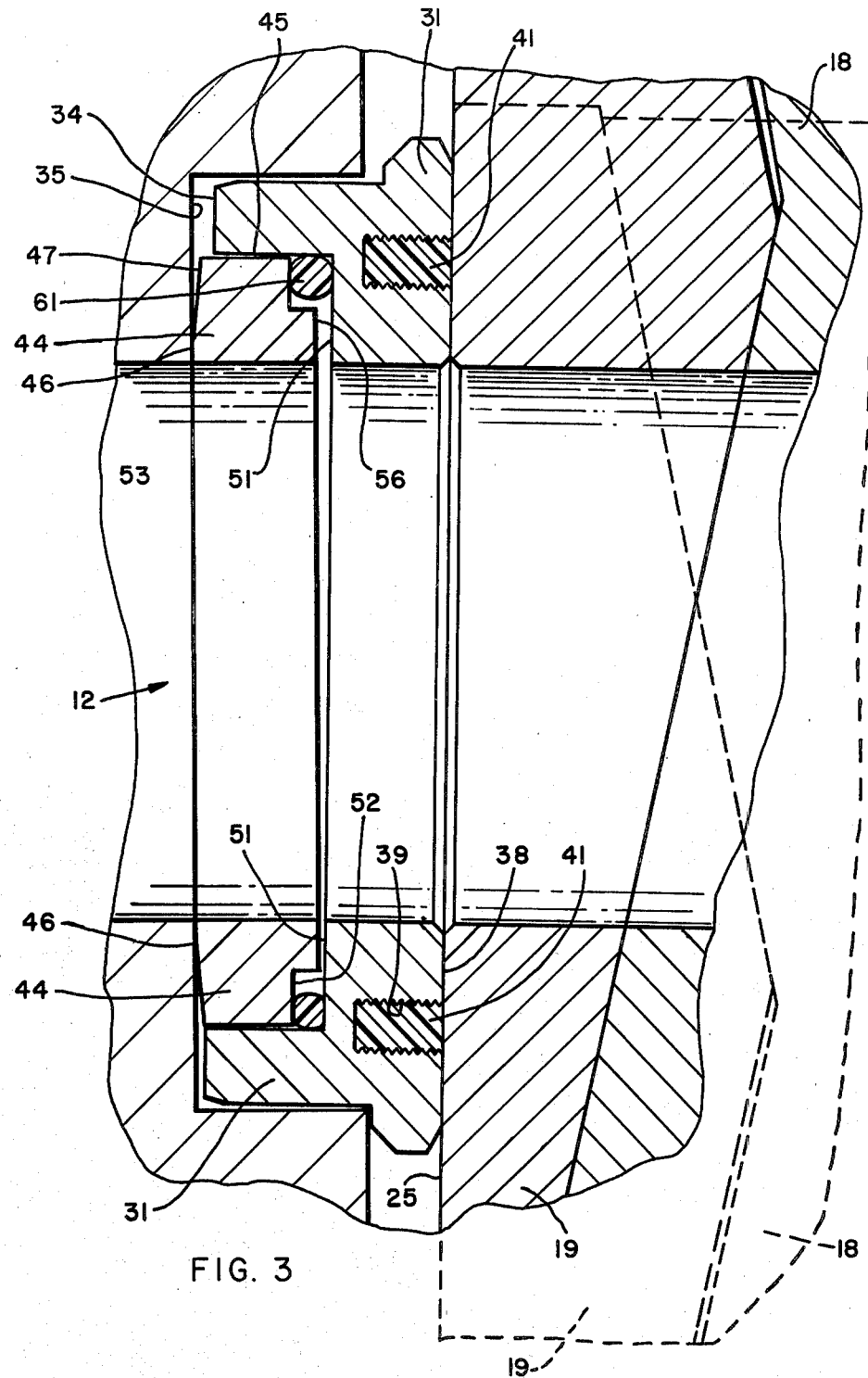
FIG. 3 is a fragmentary sectional view similar to FIG. 2 with the closed position of the gate assembly shown in phantom lines and showing the orientation of the valve seat assembly of the invention under conditions wherein the faces of the gate assembly are out-of-parallel with respect to one another and the conditions are exaggerated for purposes of illustration.

The seat assembly of this invention is shown in detail in enlarged views thereof in FIGS. 2 and 3. The seat assembly which is shown installed in the upstream seat pocket 26 comprises a main seat ring 31, the central bore of which corresponds in diameter and configuration to that of the flow passage through the valve. The seat ring 31 is formed with a portion of reduced external diameter which fits within the seat pocket 26 and a larger external diameter portion which is disposed within the valve chamber 11. In addition, the axial dimension of the ring 31 exceeds that of the seat pocket 26 so that the external annular shoulder 33 which is formed at the junction of the reduced and enlarged diameter portions of the seat ring 31 is spaced from the wall 16A of the valve chamber 11.

According to the invention, the external diameter of the portion of the seat ring 31 which is received in the seat pocket 26 is designed to be slightly less than the diameter of the seat pocket so that a slight clearance exists between the external cylindrical wall 36 of the reduced diameter portion of the seat ring 31 and the outer cylindrical wall 37 of the seat pocket. Accordingly, the seat ring fits loosely therein.

The front face 38 of the seat ring 31 is formed with an annular groove 39 therein which is concentric with the bore of the ring 31 and in surrounding relation to the inlet flow passage 12. The groove 39 accommodates an annular resilient Teflon seal 41, or similar deformable plastic material, which is pressed therein and is adapted to establish a seal with the face 25 of the segment member 19 of the gate assembly when the gate assembly is expanded thereagainst. As is conventional, the groove 39 is provided with a series of serrations which grip the walls of the insert 41 and prevent its extrusion. In the unexpanded condition of the gate assembly, the insert 41 extends slightly beyond the face 38 of the seat ring 31.

The seat assembly of the invention also includes a smaller inner sealing ring member or "float" ring 44 which seats within an annular recess formed by a counterbore in the rear surface of the seat ring 31 which faces the bottom 35 of the seat pocket. The diameter of the external cylindrical surface 45 of the "float" ring 44 is also designed slightly smaller than the diameter of the counterbore recess so the "float" ring 44 fits loosely therein. In addition, as shown in FIG. 2, its axial dimension is slightly greater than the axial depth of the counterbore so that contact with the bottom 35 of the seat pocket is made by the outer face of the "float" ring 44 which comprises an annular landed surface 46. The landed surface 46 lies in a radial plane with respect to the axis of the "float" ring 44 and adjacent the axial bore thereof, extending radially outward therefrom. The outer face of the "float" ring 44 is also bevelled to define a frusto-conical surface portion 47 which tapers away from the annular landed surface 46 towards the external cylindrical surface 45 of the "float" ring.

The "float" ring 44 is also formed with a reduced external diameter at the inner end portion thereof which is disposed against the annular bottom 51 of the couterbore recess in the seat ring 31. This reduced diameter portion forms an annular recess in the exterior of the "float" ring 44 as defined by an annular radial shoulder 52 and the intersecting cylindrical surface 53 of the reduced diameter portion of the "float" ring. The front face 56 of the "float" ring is an annular planar surface which is adapted to be disposed flush against the annular bottom 51 of the counterbore recess in the seat ring 31.

It is also to be noted that the central bores of the rings 44 and 31 correspond in configuration and cross-section to that of the flow passage 12 and in the open condition of the valve are substantially aligned therewith.

Under ideal conditions as illustrated in FIG. 2, the faces 24 and 25 of the gate assembly, which are adapted to be disposed against the face 38 of the seat ring 31 in each valve seat assembly, are machined perfectly parallel and the front and rear faces of the valve seat structure as well as the bottom of the seat pocket are also parallel thereto. Under such ideal conditions, an effective seal is established between the front face 38 of the seat ring and the face 23 of the segment 19 of the gate assembly by the resilient insert 41 in the valve seat structure which is disposed on the upstream side of the gate assembly. In addition, a metal-to-metal seal is established between the face 56 of the "float" ring and the bottom surface 51 of the counterbore recess in the seat ring 31 and a third seal is established between the rear face 46 of the "float" ring 44 and the bottom surface 35 of the seat pocket. While only the seat ring assembly for the upstream side of the valve has been described, it is to be understood that the seat ring assembly on the downstream side is of identical configuration and orientation. In addition, under the ideal conditions noted above, the sealing relationships established by the downstream valve seat structure correspond identically to those established by the upstream valve seat structure, with the outer face 24 of the gate element 18 sealing against the face 38 of the downstream valve seat structure.

In addition to the seat ring 31 and "float" ring 44, the seat ring assembly of this invention also comprises a resilient O-ring member 61 of an elastomer material, such as Viton or the like, which is disposed in the chamber formed between the "float" ring and seat ring and defined by the walls 52 and 53. The inner diameter of the O-ring 61 corresponds to the external diameter of the cylindrical wall 53 of the "float" ring 44 so that it is designed to fit snugly thereabout. However, the external peripheral diameter of the O-ring is less than the diameter of the counterbore wall 48 and the diameter of a radial cross-section of the O-ring is slightly larger than the axial dimension of the chamber. Consequently, in the condition of the seat ring assembly with the "float" ring wall 51 flush against the wall 56 of the seat ring 31 as shown in FIG. 2, the O-ring 61 is compressed between the "float" ring 44 and the seat ring 31 and provides a secondary seal therebetween.

It is to be noted that while FIG. 2 is an illustration of the orientation of the seat ring assembly when the gate assembly is expanded in the open position of the valve; the orientation of the seat ring assembly components in the expanded closed condition of the gate assembly is exactly the same as appears in FIG. 2. In the usual state of affairs, however, the outer walls 24, 25 of the gate assembly elements which are intended to seal against the seat rings 31 are not machined perfectly parallel and are not parallel in the expanded condition of the gate assembly. In addition, out-of-parallelism usually exists between the front and rear faces of the valve seat structure and the bottom of the seat pocket. Although such out-of-parallel conditions might be extremely small, corresponding to a divergence measure of only a small part of a degree, this usually results in a requirement of greater force (torque) for expanding the gate assembly to obtain a seal.

The novel valve seat structure of this invention is particularly adapted to compensate for an out-of-parallel condition existing between the outer sealing faces of the gate assembly elements or a misalignment of the valve seat structure and a gate assembly element. The orientation of the components of the seat ring assembly and the manner in which the valve seat structure compensates for such an out-of-parallel condition is illustrated in FIG. 3. Although such out-of-parallelism is in the range of only a small part of a degree in divergence, and typical clearances in the range of approximately 0.005 inches or less, an exaggerated condition is depicted in FIG. 3 to facilitate the description of the invention.

With the subject invention, due to action of the O-ring 61 which tends to urge the "float" ring 44 and the seat ring 31 apart, the seat ring 31 is adapted to orient itself by tilting to where its front face 38 is disposed flush against the flat face 24 or 25 of the adjacent gate element or segment when the gate assembly is in its expanded condition. At the same time, the "float" ring 44 is oriented by the biasing action of the O-ring 61 to align the annular land surface 46 flush against the bottom 35 of the seat pocket.

When line pressure exists on the upstream side of the valve, fluid enters from the flowline between the abutting faces of the "float" ring 44 and the larger seat ring 31 and thereby exerts a fluid pressure therebetween. The radial distance between the center of the flowway and the O-ring 61 is designed such as to exceed the radial distance between the center of the flowway and the inner edge of the plastic insert 41 on the front face of the seat ring 31. Accordingly, a differential area exists which results in a force that urges the seat ring towards the gate assembly element to effect a sealing contact therewith. At the same time, the fluid pressure forces the "float" ring 44 against the bottom of the seat pocket to establish a metal-to-metal seal between the landed surface 46 of the "float" ring and the bottom of the seat pocket. It also causes a radial expansion of the resilient O-ring 61, compressing it against the cylindrical wall of the counterbore and the faces 42 and 51 of the "float" ring seat ring, respectively, to thereby establish a fluid-tight seal therebetween.

It will therefore be seen that the valve seat structure of this invention will effectively establish an upstream seal in both the open and closed conditions of the valve when there is fluid pressure in the flowline and it is unopposed by fluid pressure in the valve chamber. In the closed condition of the valve, a downstream seal is effected by the check valve action of the gate assembly which is forced against the downstream valve seat structure by the flowline pressure. If the valve is being moved to closed condition when fluid is flowing through the flowline, there will, of course, be pressurized fluid in the valve chamber. Should a leak then occur in the downstream seal, the fluid pressure in the valve chamber will be relieved and the upstream valve seat structure will operate as described to establish an effective upstream seal. The valve is therefore particularly suited for block and bleed service, i.e., service where the valve chamber can be bled to indicate leakage past either seat. As the pressure is bled from the chamber, the upstream valve seat structure operates to establish an effective upstream seal.

In the design of the valve, it is to be noted that as the difference in the radial distance from the center of the flowline to the O-ring cross-sectional center and the radial distance to the inner edge of the annular insert 41 is increased, the force which acts to push the seat ring 31 out against the gate assembly is increased. Obviously, these radial distances and the resulting differential annular area can be varied to obtain a desired bearing and sealing pressure for low or high operating fluid pressures and can also be selected to adjust the operating force for the valve, i.e., the torque required to turn the handwheel. This differential in most instances would be very small to reduce the required torque for ease of valve operation. Similarly, the annular landed surface 46 of the "float" ring 44 which engages the bottom of the seat pocket is preferably selected to be relatively small for achieving good bearing and sealing pressure.

The fit of the seat ring 31 in the seat pocket and the fit of the "float" ring 44 in the counterbore of the ring 31 must be sufficiently loose to permit sufficient tilting of these elements to effect their flush contact and sealing with the adjacent gate assembly element and the bottom of the seat pocket.

It would, of course, be possible to use a different type of valve seat structure on the downstream side but where bi-directional use is contemplated, the valve seat structure of this invention should be used on both the upstream and downstream sides of the gate assembly. It is also a feature of the invention that the valve seat structure can be installed or replaced without the need for any special tooling since they may be merely inserted into the seat pockets by hand. They can also be used with either rising stem or non-rising stem valves.

The embodiment of the invention illustrated in FIGS. 2 and 3 is suited for valves to be used with fluid operating pressures up to approximately 5,000 psi. For greater operating pressures, the O-ring 61 of an elastomer material, might be more susceptible to failure. Accordingly, a modified form of the valve seat structure which is suitable for use with higher valve operating pressures is illustrated in FIG. 4.

Figure 4:
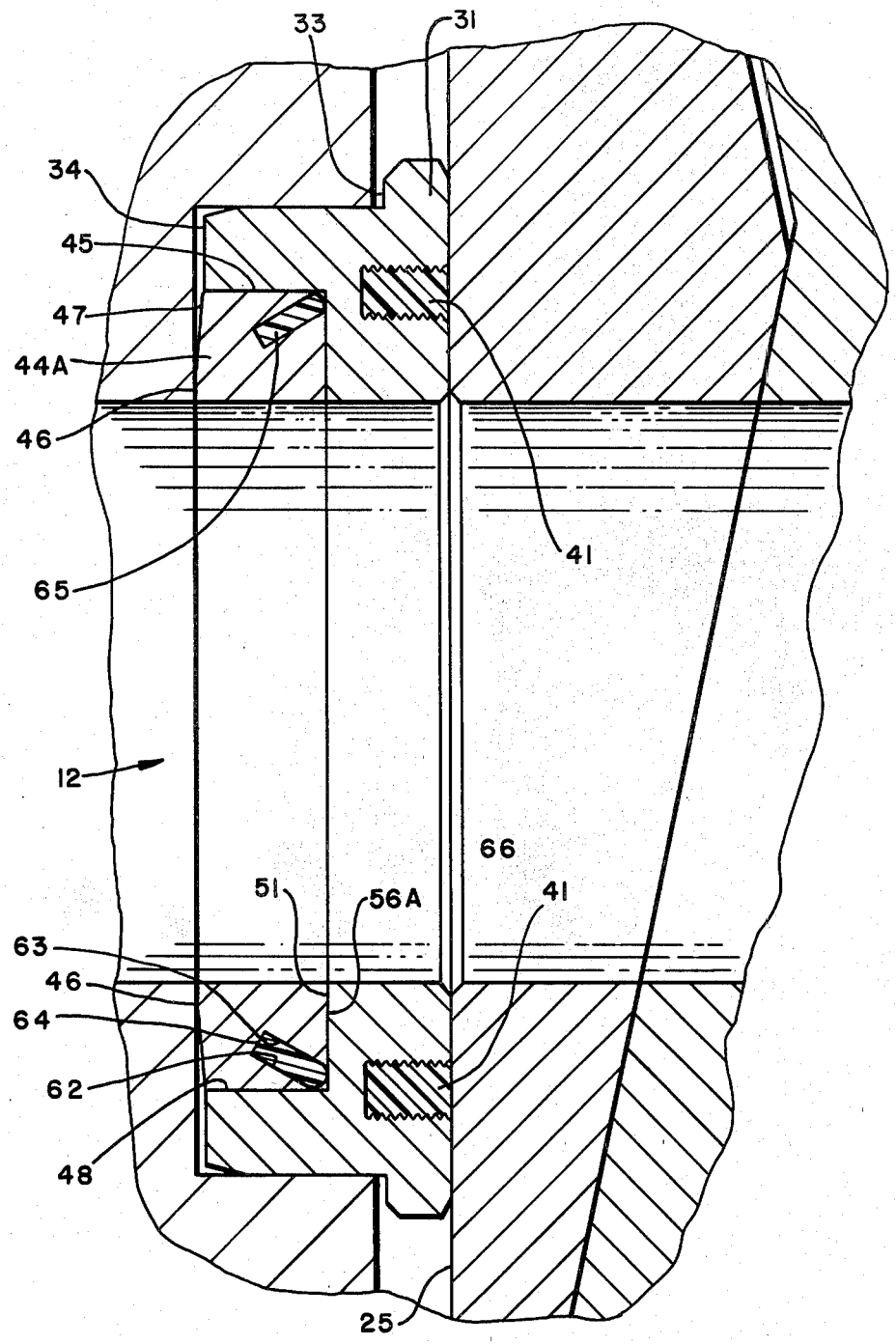
FIG. 4 is a fragmentary sectional view taken on a vertical plane and illustrating a valve seat assembly constructed according to a second embodiment of the invention.

The valve seat structure in FIG. 4 differs from the embodiment of FIGS. 2 and 3 in that the "float" ring is modified to accommodate an annular Teflon insert or similar plastic in lieu of the elastomer O-ring 61. For ease of description, elements of the valve seat structure in FIG. 4 which are identical to the embodiment of FIGS. 2 and 3 are identified by the same reference numbers.

As seen in FIG. 4, the "float" ring member 44A is formed with an external annular groove having side walls defined by a pair of frusto-conical surfaces 62, 63 extending from the groove bottom 64, one of which terminates at the external cylindrical surface 45A of the "float" ring 44A and the other of which terminates at the annular planar surface 56A. An annular Teflon insert 65 is disposed within the groove and is dimensioned and configured to fit tightly therein. When bottomed in the groove, the Teflon insert 65 extends slightly beyond the end of the groove and the edges of the exposed outer face 66 of the insert, which is also a frusto-conical surface, engage the counterbore walls 48 and 51.

Preferably the annular groove is designed such that the frusto-conical surface 62 is disposed at an angle of approximately 20 degrees with respect to the cylindrical counterbore wall 48, when the "float" ring 44A is seated snugly in the counterbore under ideal conditions as shown in FIG. 4. Under conditions corresponding to those illustrated in FIG. 3, wherein an out-of-parallel condition exists between the sealing faces 24, 25 of the gate assembly, fluid from the flow passage 12 enters between the faces 51 and 56A of the seat ring and "float" ring and the fluid pressure exerted thereby tends to compress the Teflon insert 65 in the groove but also urges the annular portion of the "float" ring, which is between the groove and the circumferential wall 45 of the "float" ring, in a radially outward direction thereby effecting a fluid-tight seal therebetween. This seal is established even though the seat ring 31 and "float" ring 44A are urged apart and oriented to establish metal-to-metal sealing relationship with the gate assembly and the bottom of the seat pocket in the same manner as illustrated with the embodiment in FIG. 3.

It is to be understood that the foregoing description of the invention has been presented for purposes of illustration and explanation and is not intended as limiting the invention to the precise form disclosed as changes in details of construction may be made by those skilled in the art, within the scope of the appended claims, without departing from the spirit of the invention. It is intended that the scope of the invention be defined by the claims appended hereto.

What is claimed is:

1. In a gate valve structure having a valve body with a valve chamber and inlet and outlet flow passages communicating with the valve chamber and defining a flowway through said valve body, an expanding gate assembly mounted in said valve chamber for movement between open and closed positions relative to said flow passages, said gate assembly including a gate and a segment, each provided with an outer planar sealing surface and expanding away from each other in said open and closed positions, and an annular recess in said valve body surrounding said inlet flow passage and opening to said flow passage and said valve chamber to define a seat pocket having a bottom wall and a circumferential side wall;

an improved metallic seat assembly mounted in said annular recess for sealing against said gate assembly, said seat assembly comprising a main outer ring disposed in substantially coaxial relation with said inlet flow passage and fitting loosely within said annular recess, said outer ring having a rear face and a planar front face disposed within the valve chamber for sealing between the main ring and the adjacent sealing surface of said segment of the gate assembly when the gate assembly is in its expanded condition, said main ring having a counterbore recess formed in said rear face thereof extending axially inwardly therefrom and defining an annular bottom surface in said counterbore recess;

an inner auxiliary support ring fitting loosely within said counterbore recess of the main ring and provided with an axial dimension which exceeds the depth of said counterbore recess, said auxiliary ring having an annular rear face surrounding and adjacent said inlet flow passage and adapted to contact said seat pocket bottom wall to thereby space said main ring from said bottom wall;

and an annular expansible resilient sealing element disposed and compressed between the bottom of said counterbore recess in said main ring and the opposed adjacent face of said auxiliary ring in surrounding relation to said inlet flow passage to urge said rings away from each other and said outer ring to where its front face is flush against the adjacent sealing surface of the gate assembly and said auxiliary ring to where its rear face is flush against the bottom wall of said seat pocket whereby if an out-of-parallel condition exists between said outer sealing surfaces of the gate assembly, pressurized flowline fluid enters between said main ring and auxiliary rings and in the event of a downstream leak, forces said main ring into sealing engagement with the gate assembly and said auxiliary ring seals against the bottom wall of the seat pocket, said annular expansible resilient sealing element being radially expanded against said circumferential wall and compressed between said rings to establish a fluid-tight seal therebetween.

2. An improved seat assembly for a gate valve as set forth in claim 1 wherein said annular expansible resilient sealing element is an O-ring.

3. An improved seat assembly for a gate valve as set forth in claim 1 wherein said auxiliary ring is provided with an annular front face, an external circumferential side wall, a circumferential annular groove in the exterior thereof which opens to said front face and said circumferential side wall with said annular expansible resilient sealing element fitting within said annular groove in abutting relation to said annular bottom surface of the counterbore recess.

4. An improved seat assembly as set forth in claim 2 wherein said planar front face of the main outer ring is provided with an annular groove therein encompassing the opening through said main outer ring and an annular resilient sealing element seated within said annular groove and dimensioned to extend beyond said planar front face for sealing between said main outer ring and the adjacent sealing surface of the gate assembly, said annular resilient sealing element being radially spaced from the inlet flow passage a distance less than the radial spacing of said O-ring from the inlet flow passage to provide a fluid pressure differential area which tends to urge said main ring against the gate valve assembly when said main ring is exposed to fluid pressure from said inlet flow passage.

5. A gate valve structure comprising a valve body with a valve chamber and inlet and outlet flow passages communicating with the valve chamber and defining a flowway through said valve body, an expanding gate assembly mounted in said valve chamber for movement between open and closed positions relative to said flow passages, said gate assembly including a gate and a segment expanding away from each other in said open and closed positions, and each provided with an outer planar sealing surface, a pair of annular recesses in said valve body, each surrounding and opening to a different one of said flow passages and said valve chamber to define a seat pocket having a bottom wall and a circumferential side wall;

an improved seat assembly mounted in each said annular recess for sealing against said gate assembly, each said seat assembly comprising a main metallic outer ring disposed in substantially coaxial relation with said flow passages, and fitting loosely within the annular recess in which it is mounted, said outer ring having a rear face and a planar front face disposed within the valve chamber for sealing between the main ring and the adjacent sealing surface of said gate assembly when the gate assembly is in its expanded condition, said main ring having a counterbore recess formed in said rear face thereof extending axially inwardly therefrom and defining an annular bottom surface in said counterbore recess;

an inner metallic auxiliary ring fitting loosely within said counterbore recess of the main ring and provided with an axial dimension which exceeds the depth of said counterbore recess, said auxiliary ring having an annular rear face surrounding and adjacent one of said flow passages and adapted to contact said seat pocket bottom wall to thereby space said main ring from said bottom wall;

and an annular expansible resilient sealing element disposed and compressed between the bottom of said counterbore recess in said main ring and the opposed adjacent face of said auxiliary ring in surrounding relation to said one of said flow passages to urge said rings away from each other and said outer ring to where its front face is flush against the adjacent sealing surface of the gate assembly and said auxiliary ring to where its rear face is flush against the bottom wall of said seat pocket.

6. A gate valve structure as set forth in claim 5 wherein said annular expansible resilient sealing element is an O-ring.

7. A gate valve structure as set forth in claim 5 wherein said auxiliary ring is provided with an annular front face, an external circumferential side wall, a circumferential annular groove in the exterior thereof which opens to said front face and said circumferential side wall with said annular expansible resilient sealing element fitting within said annular groove in abutting relation to said annular bottom surface of the counterbore recess.

8. In a gate valve structure having a valve body with a valve chamber and inlet and outlet flow passages communicating with the valve chamber and defining a flowway through said valve body, an expanding gate assembly mounted in said valve chamber for movement between open and closed positions relative to said flow passages, said gate assembly being provided with a pair of generally parallel outer planar sealing surfaces which expand away from each other in said open and closed positions, and an annular recess in said valve body surrounding said inlet flow passage and opening to said inlet flow passage and said valve chamber to define a seat pocket having a rear wall and a circumferential side wall;

an imroved seat assembly mounted in said annular recess for sealing against said gate assembly on the upstream side thereof, said seat assembly comprising a metallic outer ring in generally coaxial relation with said inlet flow passage, said outer ring having a rear face and a planar front face disposed within the valve chamber for sealing between the outer ring and the adjacent sealing surface of the gate assembly when the gate assembly is in its expanded condition, said main ring having a counterbore recess formed in said rear face thereof extending axially inwardly therefrom and defining an annular bottom surface in said counterbore recess;

an inner auxiliary metal ring fitted within said counterbore recess of the main ring and provided with an axial dimension which exceeds the depth of said counterbore recess, said auxiliary ring having an annular rear face surrounding and adjacent said intlet flow passage and adapted to contact said seat pocket rear wall to thereby space said main ring from said rear wall;

and an annular expansible resilient sealing element disposed and compressed between the bottom of said counterbore recess in said main ring and the opposed adjacent face of said auxiliary ring in surrounding relation to said inlet flow passage to urge said rings away from each other, said outer ring being loosely mounted within said annular recess against said expansible resilient sealing element for adaptive tilting movement into flush contact with the adjacent sealing surface of the gate assembly and said auxiliary ring being loosely mounted within said counterbore recess against said expansible resilient sealing element for adaptive tilting movement into flush engagement with said rear wall of the seat pocket even though an out-of-parallel condition exists between said outer sealing surfaces of the gate assembly whereby pressurized flowline fluid entering between said main ring and auxiliary ring when said vacuum chamber is free of flowline pressure and force said main ring into sealing engagement with the gate assembly and said auxiliary ring to seal against said wall of the seat pocket, said annular expansible resilient sealing element being radially expanded against said circumferential wall and compressed between said rings to establish a fluid-tight seal therebetween.

9. An improved seat assembly for a gate valve as set forth in claim 8 wherein said annular expansible resilient sealing element is an O-ring.

10. An improved seat assembly for a gate valve as set forth in claim 9 wherein said auxiliary ring is provided with an annular front face, an external circumferential side wall, a circumferential annular groove in the exterior thereof which opens to said front face and said circumferential side wall with said O-ring fitting within said annular groove in abutting relation to said annular bottom surface of the counterbore recess.

11. An improved seat assembly as set forth in claim 9 wherein said planar front face of the main outer ring is provided with an annular groove therein encompassing the opening through said main outer ring and an annular resilient seal is seated within said annular groove and dimensioned to extend beyond said planar front face for sealing between said main outer ring and the adjacent sealing surface of the gate assembly, said annular resilient seal being radially spaced from the inlet flow passage a distance less than the radial spacing of said O-ring from the inlet flow passage to provide a fluid pressure differential area which tends to urge said main ring against the gate valve assembly when said main ring is exposed to fluid pressure from said inlet flow passage.

* * * * *